United States Patent
Gang et al.

(10) Patent No.: US 10,411,230 B2
(45) Date of Patent: Sep. 10, 2019

(54) ESS BATTERY PACK CASE

(71) Applicant: LG Chem, Ltd., Seoul (KR)

(72) Inventors: In-Jae Gang, Daejeon (KR); Ki-Youn Kim, Daejeon (KR); Jin-Kyu Shin, Daejeon (KR); Bum-Hyun Lee, Daejeon (KR); Sang-Hyun Jo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/825,341

(22) Filed: Nov. 29, 2017

(65) Prior Publication Data

US 2018/0151857 A1   May 31, 2018

(30) Foreign Application Priority Data

Nov. 29, 2016   (KR) .................. 10-2016-0160767

(51) Int. Cl.
| | |
|---|---|
| *H01M 2/04* | (2006.01) |
| *H01M 2/10* | (2006.01) |
| *H01M 10/42* | (2006.01) |
| *H01M 10/48* | (2006.01) |
| *H01M 10/627* | (2014.01) |
| *H01M 10/658* | (2014.01) |

(52) U.S. Cl.
CPC ....... *H01M 2/1072* (2013.01); *H01M 10/425* (2013.01); *H01M 10/488* (2013.01); *H01M 10/627* (2015.04); *H01M 10/658* (2015.04); *H01M 2220/10* (2013.01)

(58) Field of Classification Search
CPC ............. H01M 2/1072; H01M 10/425; H01M 10/627; H01M 10/658; H01M 10/488; H01M 2220/10
See application file for complete search history.

(56) References Cited

U.S. PATENT DOCUMENTS

| | | | |
|---|---|---|---|
| 2010/0112425 A1* | 5/2010 | Dunn .................... | H01M 2/024 429/99 |
| 2012/0100399 A1* | 4/2012 | Adachi ................... | B60L 11/18 429/7 |
| 2016/0268560 A1 | 9/2016 | Hascoet et al. | |

FOREIGN PATENT DOCUMENTS

| | | | | |
|---|---|---|---|---|
| JP | 2012009277 A | * | 1/2012 | ............. H01M 2/10 |
| KR | 10-2009-0044237 A | | 5/2009 | |
| KR | 20120041605 A | * | 5/2012 | ............. H04M 1/02 |
| KR | 101285712 B1 | * | 7/2013 | .......... H01M 2/1016 |
| KR | 20140123757 A | * | 10/2014 | ............. H01M 2/36 |

* cited by examiner

Primary Examiner — Cynthia K Walls
(74) Attorney, Agent, or Firm — Morgan, Lewis & Bockius LLP

(57) ABSTRACT

Disclosed is an energy storage system (ESS) battery pack case, which includes a case body having at least two plates assembled to each other by fitting so as to be connected to each other along a circumferential direction thereof to form a hollow therein, the case body having an open top end and an open bottom end; and an upper cover assembly configured to cover the top end of the case body and a lower cover assembly configured to cover the bottom end of the case body.

16 Claims, 15 Drawing Sheets

ESS BATTERY PACK CASE

TECHNICAL FIELD

The present application claims priority to Korean Patent Application No. 10-2016-0160767 filed on Nov. 29, 2016 in the Republic of Korea, the disclosures of which are incorporated herein by reference.

The present disclosure relates to a battery pack case, and more particularly, to a battery pack case for an energy storage system (ESS), which may be fabricated into a middle or large size by assembling unit plates.

BACKGROUND ART

Recently, secondary battery manufacturers are introducing home energy storage system (ESS) packs as new products. The ESS pack stores electricity during day time by using a lithium ion battery and is used when necessary to reduce electricity costs. For example, a lithium ion battery stores electricity generated by using solar panels, wind power or the like, and the stored electricity is used when necessary.

The home ESS pack may be fabricated in a wall-hanging form and installed on a wall or pillar of an indoor or outdoor for user convenience and space utilization. In this case, a wall-hanging bracket suitable for the characteristics of the product may be added in general.

The home ESS pack approximately has a size of about 120×80×20 cm and a weight of about 100 kg, and several home ESS packs may be used in succession.

Depending on storage capacity, the ESS pack may be configured differently in size and weight. For example, a home ESS pack having a built-in DC-DC converter is fabricated larger than a home ESS pack without a DC-DC converter.

Meanwhile, the home ESS pack case is configured so that upper and lower covers are assembled in a case body 1. Since the conventional case body is integrally manufactured by means of extrusion molding (see FIG. 1), it is very difficult to widen the width in a lateral direction (an X-axis direction), among its length, width and height. Thus, the conventional ESS pack case has a large space restriction when additional electric components such as a DC-DC converter are included.

In addition, in a flame spread resistance test (a test to check whether flame is exposed out of a pack case after an ignition occurs inside the pack case), which is one of certification tests for product performance and safety (for example, UL certification), since the conventional ESS pack is manufactured using an integrally extruded case, if an ignition occurs inside the pack case, the pack case is easily deformed due to the increase of pressure caused by the generated gas. As a result, the conventional ESS pack often fails the certification tests.

DISCLOSURE

Technical Problem

The present disclosure is designed to solve the problems of the related art, and therefore the present disclosure is directed to providing an ESS battery pack case, which may have an inner space enough to additionally incorporate electric components such as a DC-DC converter and also easily discharge pressure to pass a flame spread resistance test and the like.

However, the technical objects aimed by the present disclosure are not limited to the above, and other objects not mentioned herein will be apparently understood from the following description by those skilled in the art.

Technical Solution

In one aspect of the present disclosure, there is provided an energy storage system (ESS) battery pack case, which has an inner space formed to accommodate a battery module and electric component, the ESS battery pack case comprising: a case body having at least two plates assembled to each other by fitting so as to be connected to each other along a circumferential direction thereof to form a hollow therein, the case body having an open top end and an open bottom end; and an upper cover assembly configured to cover the top end of the case body and a lower cover assembly configured to cover the bottom end of the case body.

An adhesive sealing material may be further interposed at every assembling portion of the at least two plates.

An insert groove may be prepared at any one of an end of any one plate among the plates and an end of another plate adjacent to the any one plate, and an insert protrusion coupled to the insert groove by fitting may be prepared at the another plate.

The insert groove and the insert protrusion may be respectively formed successively along a vertical edge of the plates.

The at least two plates may be prepared into a predetermined form by means of extrusion molding.

A drainage hole may be formed in the lower case assembly to pass therethrough in a vertical direction.

Bolt-coupling blocks may be provided in the case body to protrude inwards at predetermined locations, and the upper and lower cover assemblies may have bolt-coupling holes formed to correspond the bolt-coupling blocks in one-to-one relationship so that bolts are respectively coupled and fixed to the top end and the bottom end of the case body.

The upper cover assembly and the lower cover assembly may respectively include a cover body configured to cover the top end or the bottom end of the case body and a strength-reinforcing plate made of metal and assembled to an inner region of a rim of the cover body.

The strength-reinforcing plate may have a pair of vertical plates disposed with an interval corresponding to a width of the case body to be stand vertically with respect to the cover body, and the case body may have a vertical plate insert portion therein, formed at an inner side of the plates which are opposite to each other in a width direction of the case body, so that the pair of vertical plates are vertically coupled to the vertical plate insert portion by fitting.

The vertical plate insert portion may be provided in a pair so that two vertical plate insert portions are disposed to be spaced from each other, and each vertical plate insert portion may be formed to protrude and bend from an inner side of the case body into a "T" shape.

The case body may include a front plate which forms a front surface and both side surfaces of the case body, and a rear plate which is coupled to the front plate by fitting and forms a rear surface of the case body.

The front plate may include a front left plate which forms a part of the front surface and the left surface of the case body, and a front right plate which is coupled to the front left plate by fitting and forms the remaining part of the front surface and the right surface of the case body.

The front right plate may include a front right upper plate and a front right lower plate which are assembled up and down so that a display panel for displaying a state of charge of the battery module to the outside is interposed therebetween.

Bolts may be further coupled to assembling portions where the front left plate and the front right upper plate are respectively connected to the rear plate, and a latch may be coupled to an assembling portion where the front right lower plate is connected to the rear plate.

The rear plate may include a rear left plate which forms a part of the rear surface of the case body, and a rear right plate which is coupled to the rear left plate by fitting and forms the remaining part of the rear surface of the case body.

Advantageous Effects

According to an embodiment of the present disclosure, it is possible to provide an ESS battery pack case, which may have an inner space enough to additionally incorporate electric components such as a DC-DC converter and also easily discharge pressure to pass a flame spread resistance test and the like.

According to another embodiment of the present disclosure, the ESS battery pack case may have improved product stability and reliability since it has an anti-swelling structure and a drainage structure.

In addition, the case body may allow convenient maintenance and repair since it may be separated into each part.

BEST MODE

Figure 1:
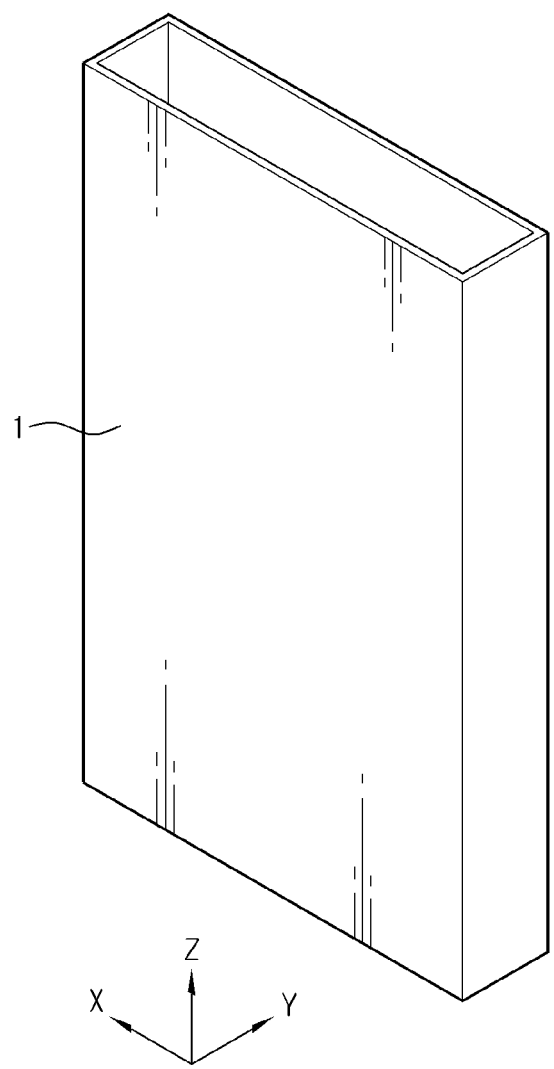
FIG. 1 is a perspective view schematically showing a case body of a conventional ESS battery pack.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Since the embodiments disclosed herein are provided for more perfect explanation of the present disclosure, the shape, size and the like of components may be exaggerated, omitted or simplified in the drawings for better understanding. Thus, the size and ratio of components in the drawings do not wholly reflect the actual size and ratio.

Figure 2:
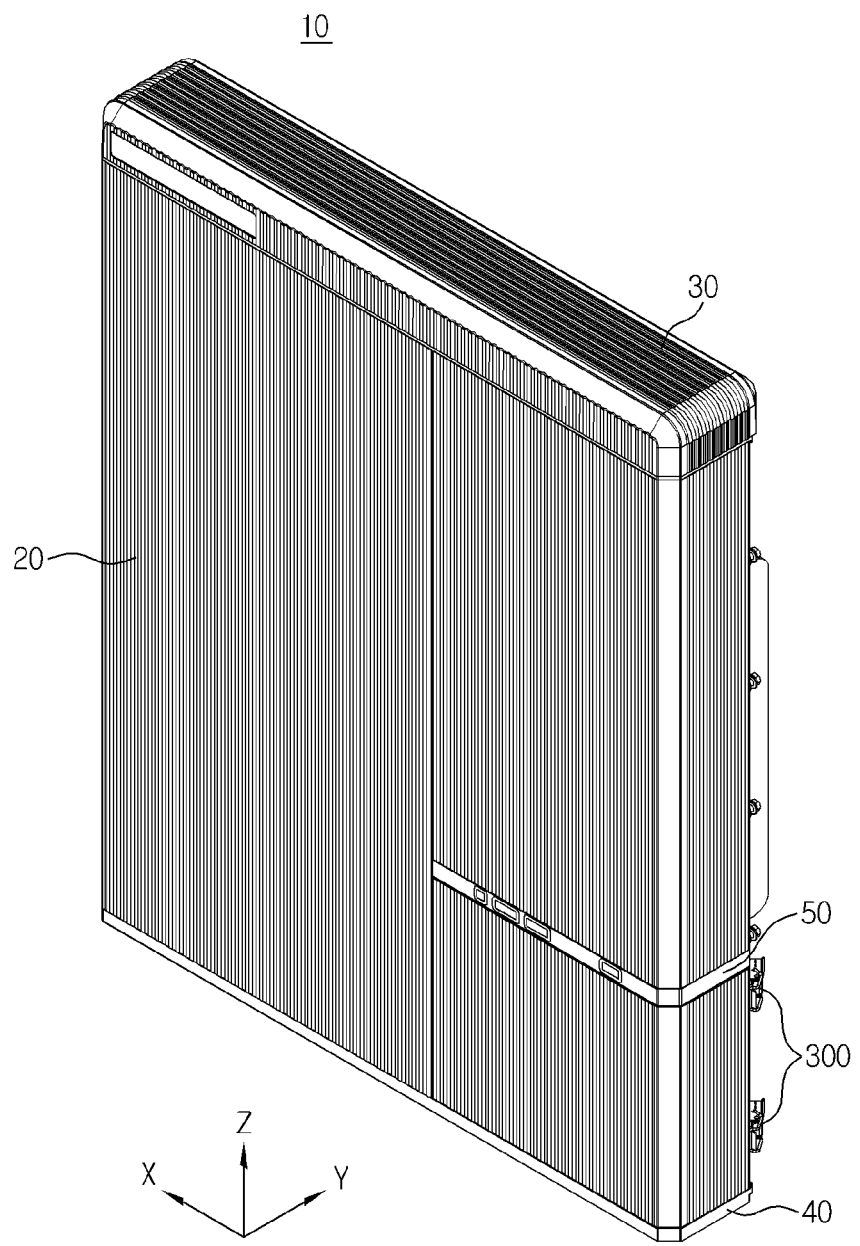
FIG. 2 is a perspective view showing an ESS battery pack according to an embodiment of the present disclosure.
Figure 3:
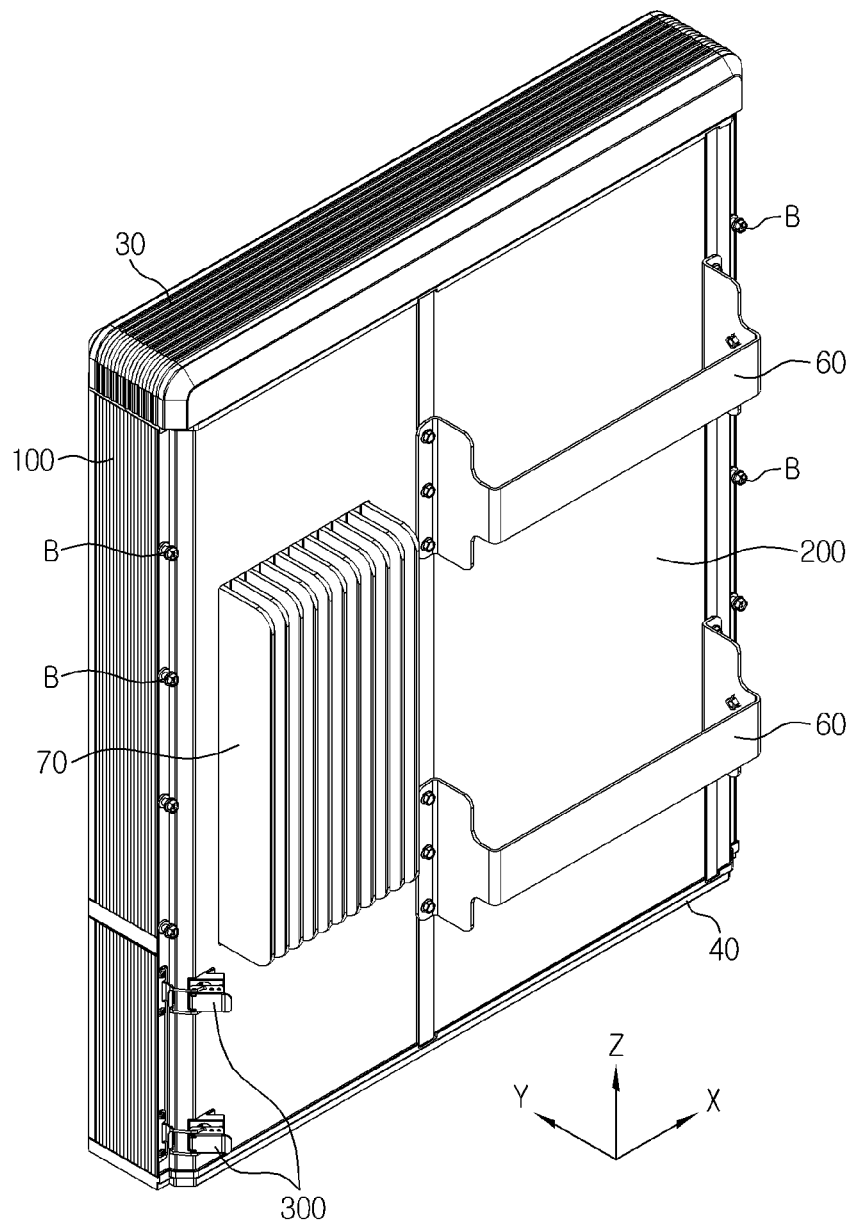
FIG. 3 is a perspective view showing the ESS battery pack of FIG. 2, observed from a rear side.
Figure 4:
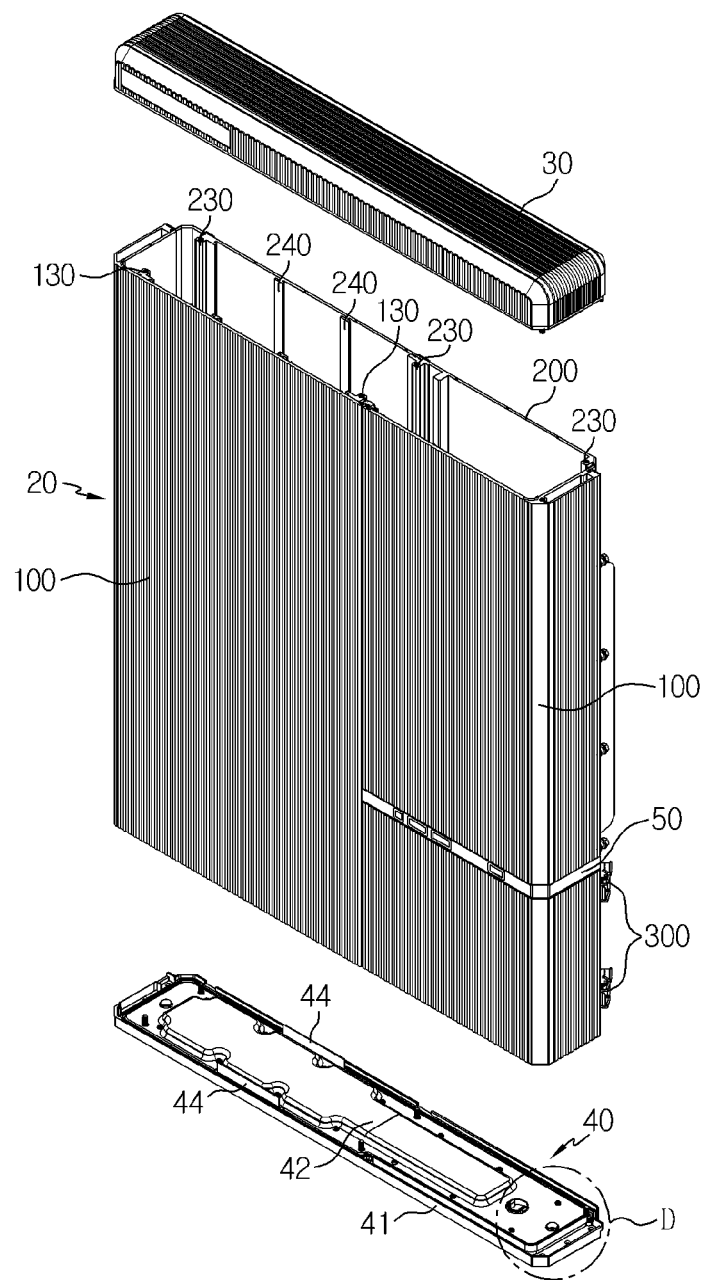
FIG. 4 is a perspective view showing the ESS battery pack according to an embodiment of the present disclosure, at which essential parts are dissembled.
Figure 5:
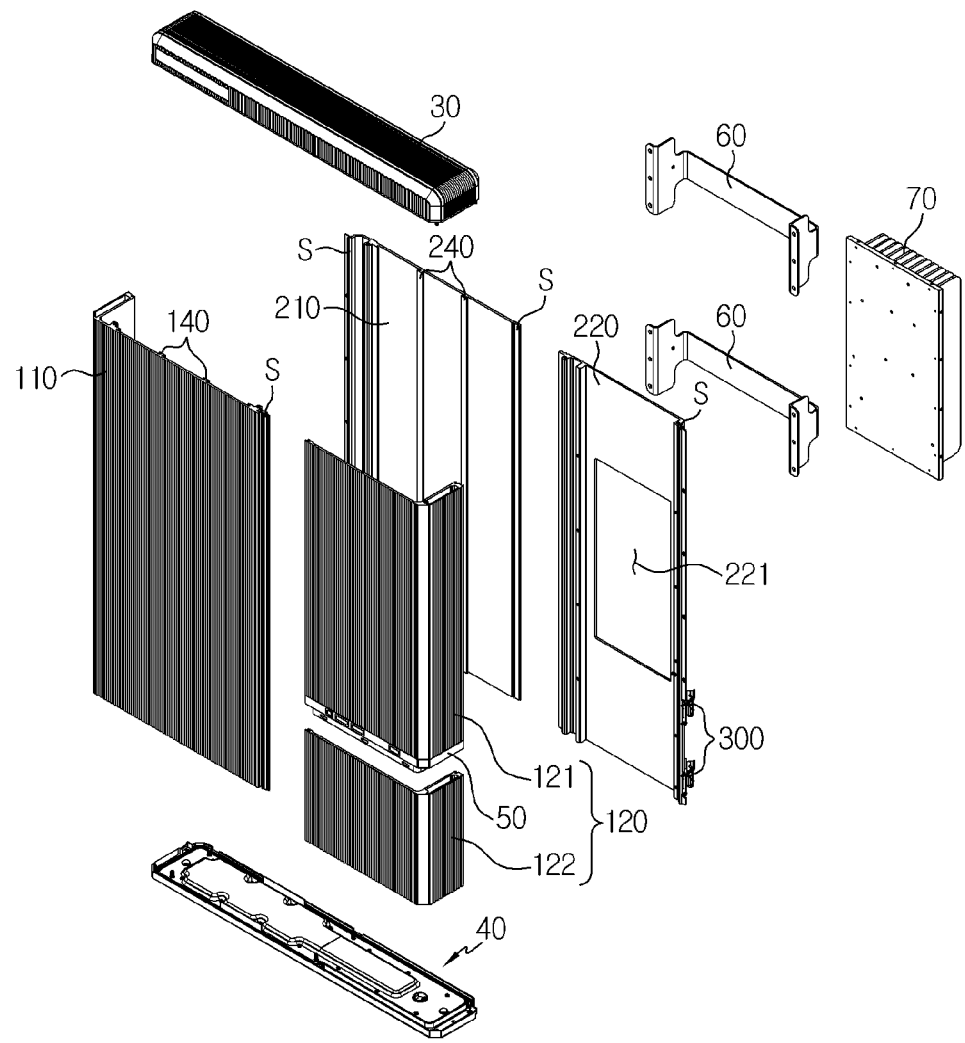
FIG. 5 is a perspective view showing the case body of FIG. 4, which is separated into each plate.

FIG. 2 is a perspective view showing an ESS battery pack according to an embodiment of the present disclosure, FIG. 3 is a perspective view showing the ESS battery pack of FIG. 2, observed from a rear side, FIG. 4 is a perspective view showing the ESS battery pack according to an embodiment of the present disclosure, at which essential parts are dissembled, and FIG. 5 is a perspective view showing the case body 20 of FIG. 4, which is separated into each plate.

Referring to FIGS. 2 to 5, an ESS battery pack case 10 according to an embodiment of the present disclosure includes a case body 20 which forms a hollow and has an open top end and an open bottom end, and an upper cover assembly 30 and a lower cover assembly 40 respectively coupled to the top end and the bottom end of the case body 20 to cover the top end and the bottom end of the case body 20.

As will be explained in more detail later, the ESS battery pack case 10 of the present disclosure may provide an inner space enough to accommodate electric components such as a DC-DC converter by assembling at least two plates with each other to form the case body 20. The case body 20 may be expanded in a lateral direction (an X-axis direction in FIG. 2) of the case body 20 by additionally assembling at least two plates, separately prepared by means of extrusion molding, along a circumferential direction. Meanwhile, all plates of this embodiment are manufactured by means of extrusion molding, but the present disclosure is not limited thereto.

First, the case body 20 of the ESS pack case 10 according to an embodiment of the present disclosure will be described in detail. The case body 20 may be mainly composed of into a front plate 100 and a rear plate 200. The front plate 100 may correspond to a portion forming a front surface and both side surfaces of the case body 20. Also, the rear plate 200 may correspond to a portion forming a rear surface of the case body 20.

The front plate 100 and the rear plate 200 may be assembled by fitting their edge portions in a vertical direction into each other, and then completely coupling and fixing them by using bolts B in a direction from the back surface toward the front surface as shown in FIG. 3. A width of the case body 20 in a lateral direction (an X-axis direction in FIG. 3) is determined by the widths of the front plate 100 and the rear plate 200. When the case body 20 is integrally manufactured by extrusion, the size of the case body 20 may be limited within a certain range due to a molding machine. However, if a plurality of plates are separately prepared by extrusion and then assembled, it is possible that the case body 20 has a larger size than the limited size of the integral case body 20.

Referring to FIGS. 4 and 5, the front plate 100 may also be composed of a front left plate 110 and a front right plate 120 which are separated from each other in a left and right direction. The front left plate 110 may correspond to a portion forming a part of the front surface and the left surface of the case body 20. The front right plate 120 may correspond to a portion forming the remaining part of the front surface and the right surface of the case body 20.

In addition, the front right plate 120 may also be composed of a front right upper plate 121 and a front right lower plate 122 separated from each other in a vertical direction. In other words, the front plate 100 of this embodiment may be formed by assembling of three plates in total.

The rear plate 200 may be composed of a rear left plate 210 and a rear right plate 220 which are separated from each other in a lateral direction, similar to the front plate 100. The rear left plate 210 may correspond to a portion forming a left side of the rear surface of the case body 20, and the rear right plate 220 may correspond to a portion forming a right side of the rear surface of the case body 20. In other words, the rear plate 200 of this embodiment may be formed by assembling two plates in total.

A wall-hanging bracket 60 may be coupled to the rear left plate 210, and a heatproof plate 70 may be mounted to the rear right plate 220. The heatproof plate 70 may be installed from an inside of the rear right plate 220 to an outside thereof through a hole 221 formed in the rear right plate 220.

In this embodiment, the front left plate 110, the front right plate 120, the rear right plate 220 and the rear left plate 210 may be assembled in a circumferential direction or a clockwise direction by fitting their edges in a vertical direction into each other.

The front right upper plate 121 and the front right lower plate 122, which form the front right plate 120, may be assembled to be fit into the front left plate 110 and the rear right plate 220, which are separated vertically and independently adjacent to each other.

Between the front right upper plate 121 and the front right lower plate 122, a display panel 50 for displaying a state of charge of a battery module to the outside may be located. Also, the display panel 50 may be equipped with a device on/off switch.

The front right lower plate 122 may be assembled to be relatively easily separated from other adjacent plates. The front plate 100 and the rear plate 200 of this embodiment may be assembled with each other by fitting and then tightly coupled by using bolts. Here, the front right lower plate 122 may be coupled to the rear plate 200 by using a latch 300, instead of a bolt.

In detail, referring to FIGS. 3 to 5, the front left plate 110 and the front right upper plate 121 are assembled to the rear plate 200 by fitting and coupled thereto by using the bolts, and the front right lower plate 122 is assembled to the rear plate 200 by fitting and coupled thereto by using the latch 300. Thus, the front right lower plate 122 may be easily dissembled from the surrounding plates by releasing the latch 300 without using a separate tool.

A control module of the ESS pack, a power cable connector and the like may be positioned inside the front right lower plate 122. In this case, the tasks related to the control module and the power cable connector of the ESS pack may be easily carried out just by separating the front right lower plate 122.

Meanwhile, as shown in FIG. 5, the case body 20 of this embodiment is composed of five unit plates in total. However, it is also possible that the case body 20 is prepared by assembling two to four unit plates, or six or more unit plates to be connected in a circumferential direction.

Figure 6:
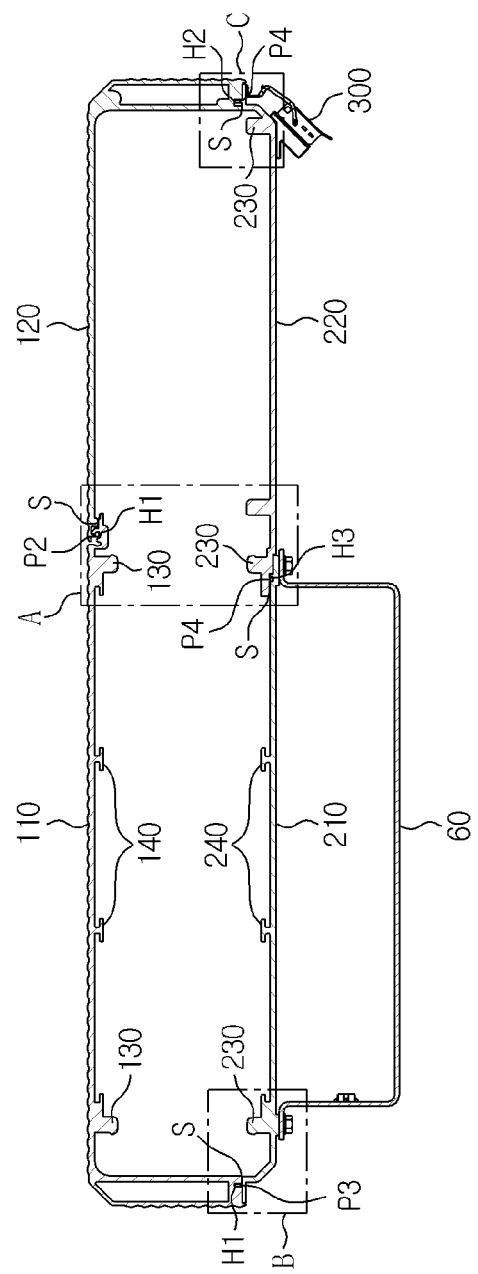
FIG. 6 is a cross-sectioned view showing the case body of FIG. 4.
Figure 7:
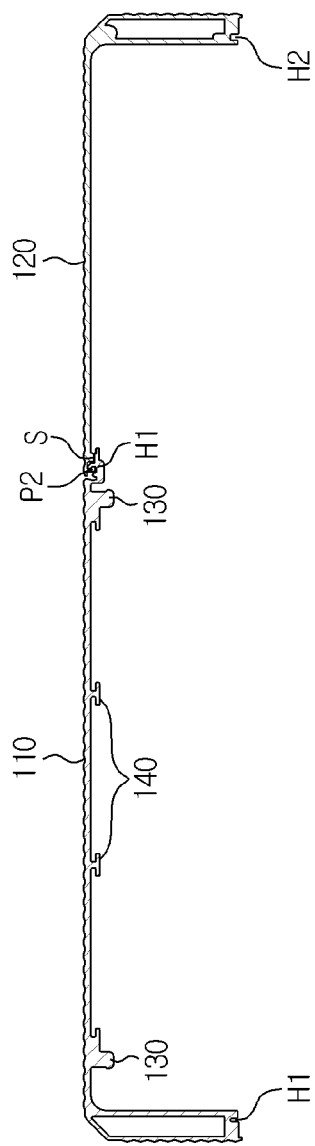
FIG. 7 shows only the front plate separately, in the case body of FIG. 6.
Figure 8:
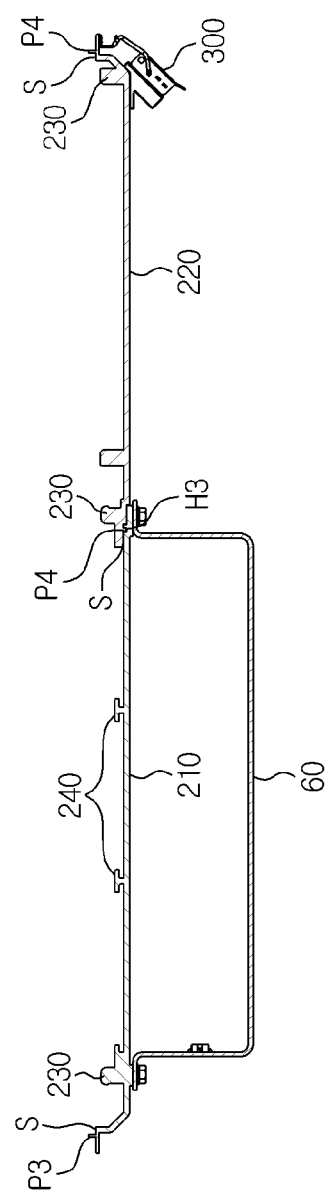
FIG. 8 shows only the rear plate separately, in the case body of FIG. 6.
Figure 9:
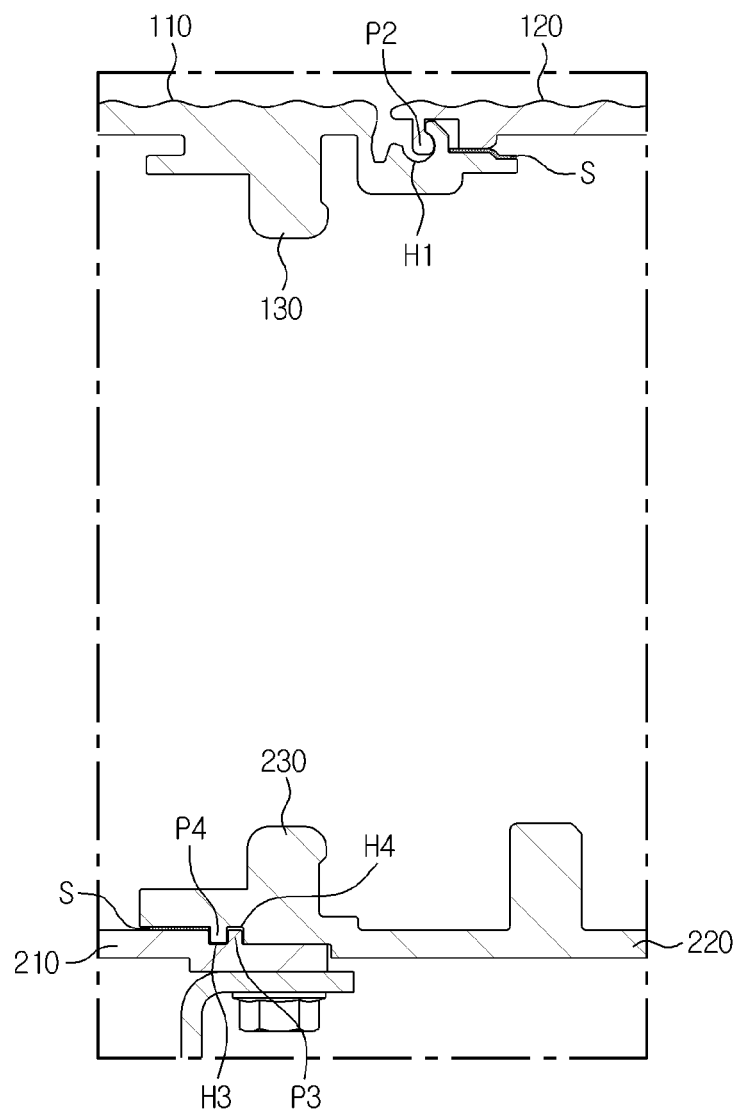
FIG. 9 is an enlarged view showing a region A of FIG. 6.
Figure 10:
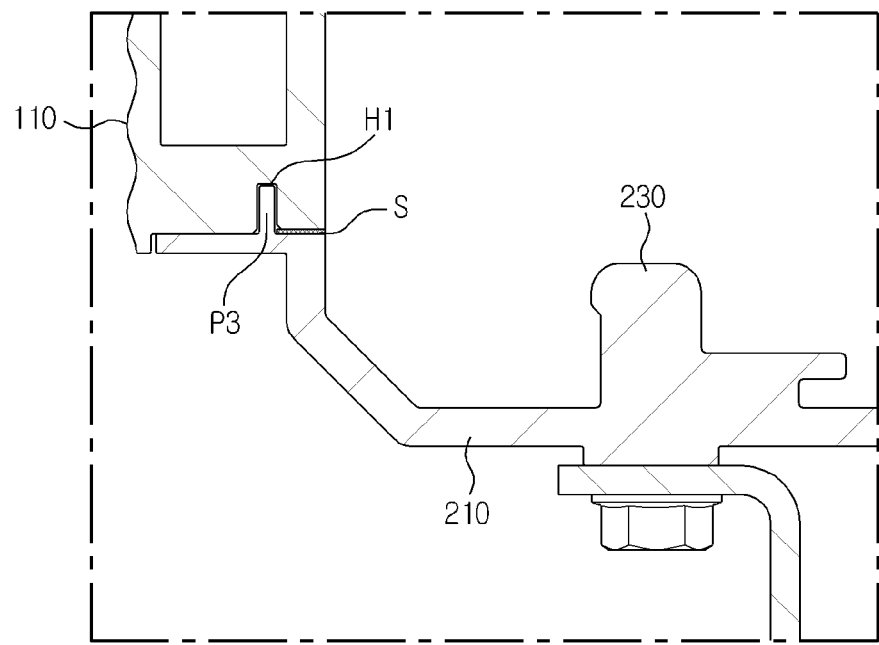
FIG. 10 is an enlarged view showing a region B of FIG. 6.
Figure 11:
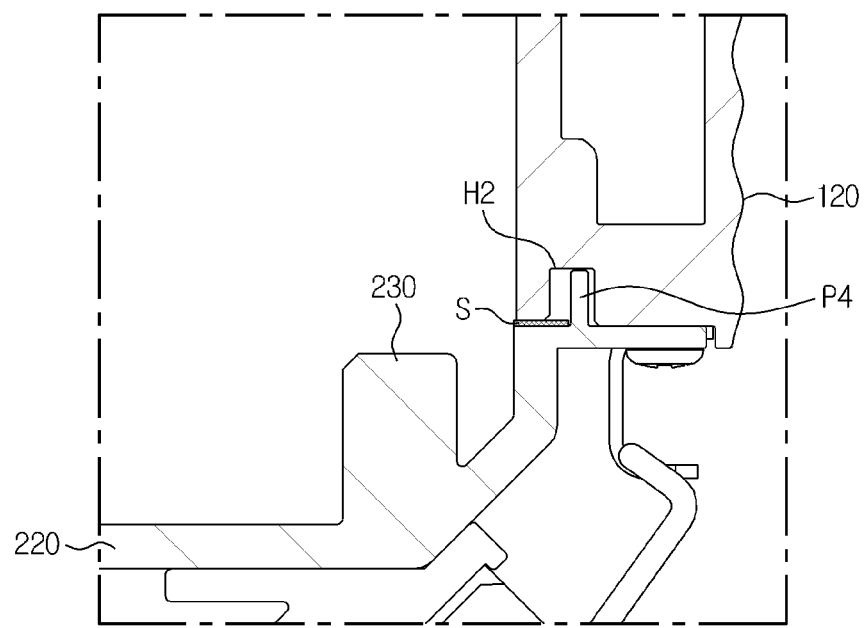
FIG. 11 is an enlarged view showing a region C of FIG. 6.

FIG. 6 is a cross-sectioned view showing the case body of FIG. 4, FIG. 7 shows only the front plate separately, in the case body of FIG. 6, FIG. 8 shows only the rear plate separately, in the case body of FIG. 6, FIG. 9 is an enlarged view showing a region A of FIG. 6, FIG. 10 is an enlarged view showing a region B of FIG. 6, and FIG. 11 is an enlarged view showing a region C of FIG. 6.

Hereinafter, the structure of assembling unit plates of the case body 20 by fitting will be described in more detail with reference to FIGS. 6 to 11.

Five unit plates in total as described above may be assembled by means of mutual fitting. An insert groove H1, H2, H3, H4 may be provided to any one of an end of any one plate among the five unit plates and an end of another plate adjacent to the any one plate, and an insert protrusion P1, P2, P3, P4 fit into the insert grooves H1, H2, H3, H4 may be provided to the other. The insert groove H1, H2, H3, H4 and the insert protrusion P1, P2, P3, P4 may be formed at both ends of an edge of each plate in a vertical direction (a Z-axis direction).

For example, as shown in FIGS. 7 and 9, the insert groove H1 of the front left plate 110 and the insert protrusion P2 of the front right plate 120 may assembled to each other by fitting to form the front plate 100, and as shown in FIGS. 8 and 9, the insert groove H3 and the insert protrusion P3 of the rear left plate 210 and the insert protrusion P4 and the insert groove H4 of the rear right plate 220 may be assembled to each other by fitting to form the rear plate 200. In addition, as shown in FIGS. 6, 10 and 11, the insert grooves H1, H2 at both edges of the front plate 100 and the insert protrusions P3, P4 at both edges of the rear plate 200 may be assembled to each other by fitting to form the case body 20.

In other words, as shown in FIGS. 6 to 11, the insert groove H1 may be provided at the left and right edges of the front left plate 110, the insert protrusion P2 may be provided at the left edge of the front right plate 120, and the insert groove H2 may be provided at the right edge of the front right plate 120. In addition, the insert protrusion P3 may be provided at the left edge of the rear left plate 210, and the insert groove H3 and the insert protrusion P3 may be provided together at the right edge of the rear left plate 210. Moreover, the insert protrusion P4 and the insert groove H4 may be provided together at the left edge of the rear right plate 220, and the insert protrusion P4 may be provided at the right edge of the rear right plate 220.

An adhesive sealing material S may be further interposed at each assembling portion of the plates according to this embodiment. The adhesive sealing material S serves to increase the sealing performance of the assembling portion by filling the space between two fit plates. Also, the adhesive sealing material S has an adhesive force to eliminate a step between two plates, so that the assembling portions may be closely adhered to each other.

The adhesive sealing material S may employ, for example, a polyethylene (PE) tape, and the PE tape (see FIG. 12) may be continuously attached along a vertical edge of each plate. As shown in FIGS. 6 and 9 to 11, the adhesive sealing material S may be interposed at four places in total, corresponding to the assembling portion between plates along a circumferential direction of the case body 20.

Figure 12:
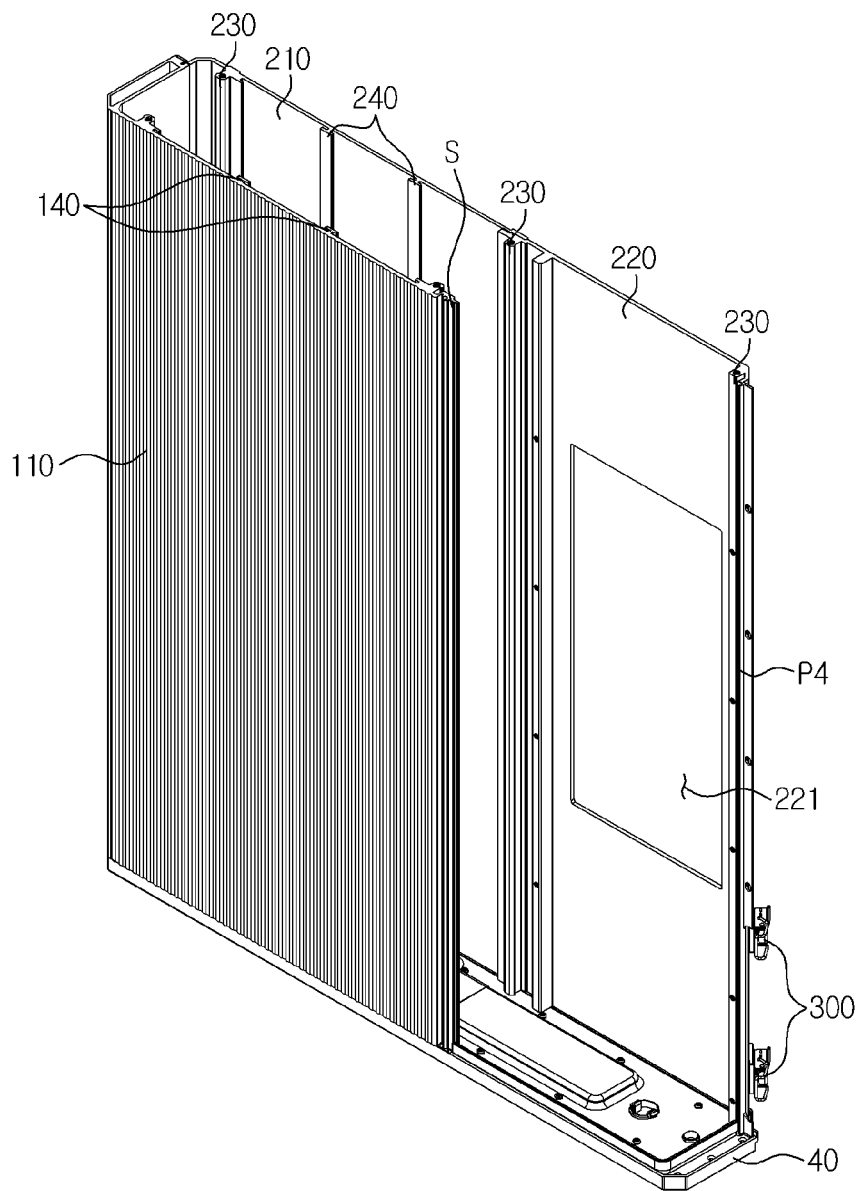
FIG. 12 is a perspective view showing the case body according to an embodiment of the present disclosure, from which the front right plate is separated, along with the lower cover assembly.
Figure 13:
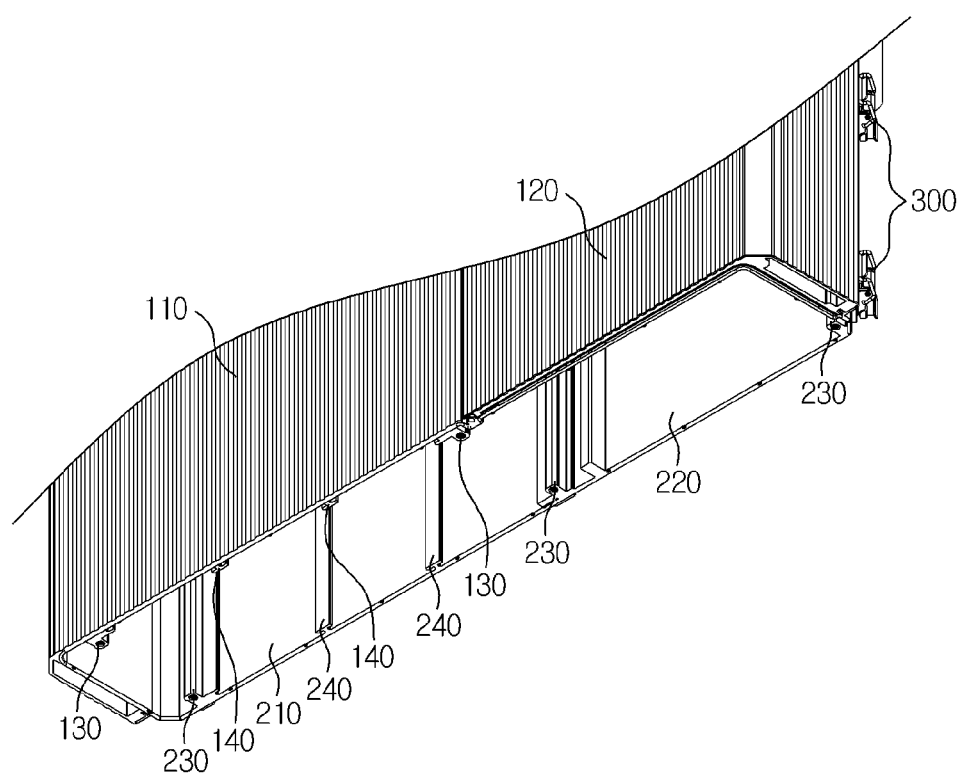
FIGS. 13 and 14 are diagrams showing the case body and the lower cover assembly according to an embodiment of the present disclosure, before and after being assembled.
Figure 14:
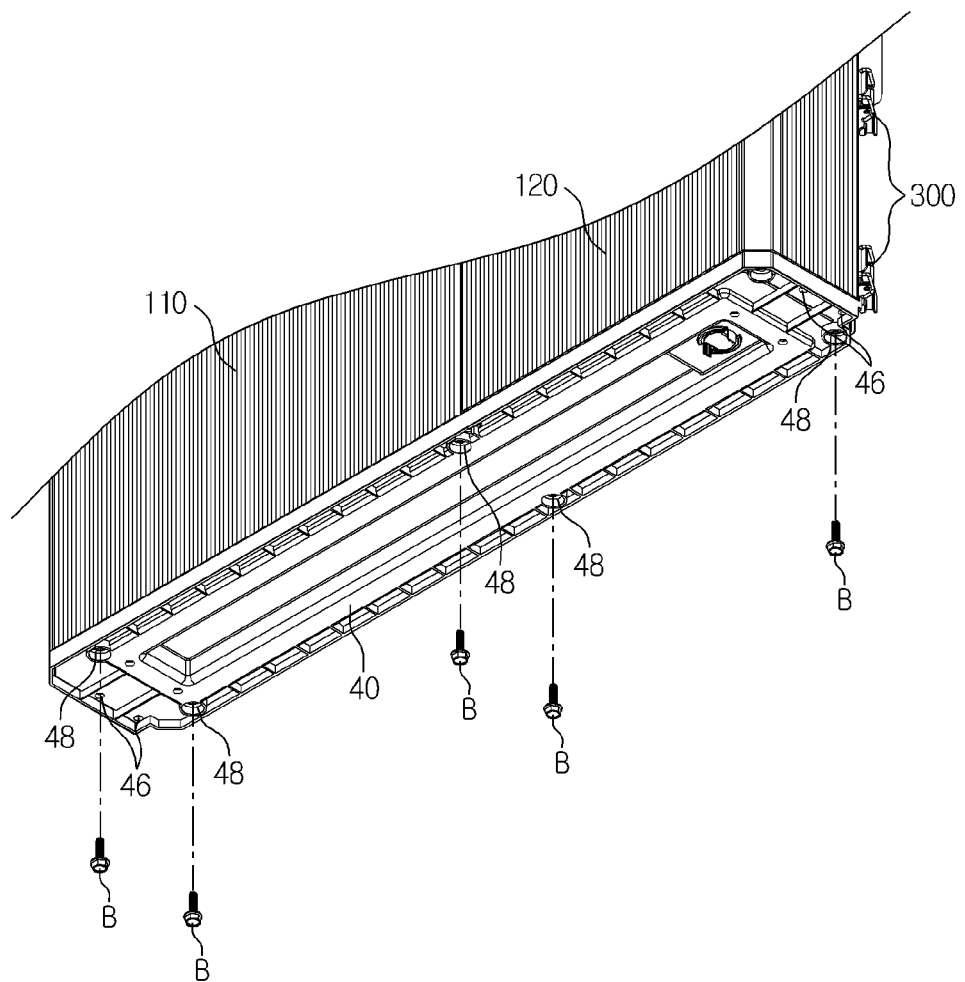

FIG. 12 is a perspective view showing the case body 20 according to an embodiment of the present disclosure, from which the front right plate 120 is separated, along with the lower cover assembly 40, and FIGS. 13 and 14 are diagrams showing the case body 20 and the lower cover assembly 40 according to an embodiment of the present disclosure, before and after being assembled.

As shown in FIGS. 12 and 13, the case body 20 may include bolt-coupling blocks 130, 230 which protrude from an inner side thereof at predetermined positions. The bolt-coupling blocks 130, 230 are the structures used to couple the upper cover assembly 30 and the lower cover assembly 40.

In this embodiment, the bolt-coupling blocks 130, 230 may be formed to elongate in a vertical direction from the bottom end of the case body 20 to the top end thereof, and five bolt-coupling blocks may be provided in total so that two bolt-coupling blocks are provided at the front plate 100 and three bolt-coupling blocks are provided at the rear plate 200. Here, the front plate 100 having the bolt-coupling blocks 130, 230 may be limited to the front left plate 110. As described above, the front right lower plate 122 of the front plate 100 allows convenient detachment without coupling the lower cover assembly 40 and the bolt B.

The lower cover assembly 40 is provided in a plate shape which may completely cover the bottom end of the case body 20, and has bolt-coupling holes 48 formed vertically through the bolt-coupling blocks 130, 230 at positions corresponding thereto in one-to-one relationship. As shown in FIG. 14, the bottom end of the case body 20 is covered with the lower cover assembly 40 so that the bolt-coupling blocks 130, 230 are aligned with the bolt-coupling holes 48, and then five bolts B are inserted into the bolt-coupling holes 48, respectively, and coupled to the bolt-coupling blocks 130, 230, so that the lower cover assembly 40 is fixedly coupled to the bottom end of the case body 20.

The upper cover assembly 30 and the case body 20 are coupled substantially in the same way as the lower cover assembly 40. In other words, bolts may be inserted into the bolt-coupling holes formed in the upper cover assembly 30, and then the bolts may be coupled to the bolt-coupling blocks 130, 230 at the top end of the case body 20.

Figure 15:
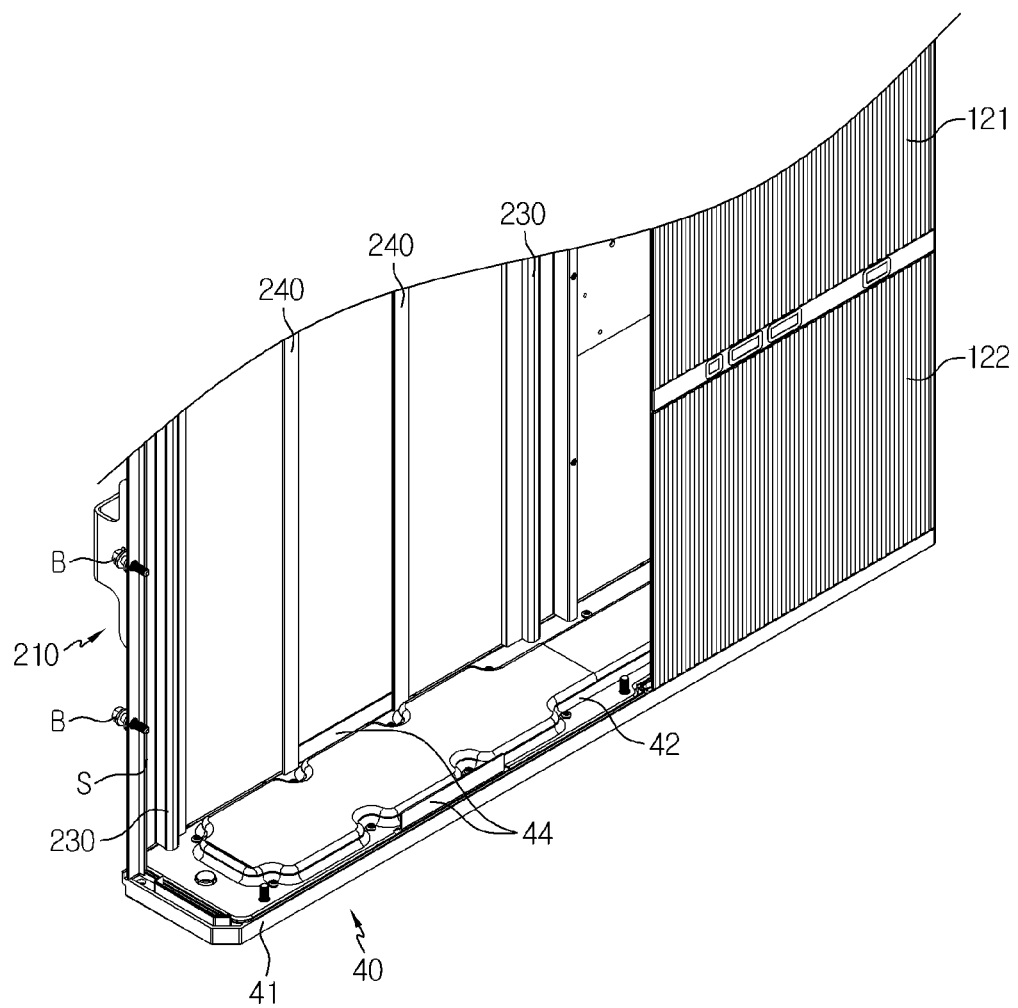
FIG. 15 is a diagram showing essential parts of the case body according to an embodiment of the present disclosure, from which the front left plate is separated, along with the lower cover assembly.

FIG. 15 is a diagram showing essential parts of the case body according to an embodiment of the present disclosure, from which the front left plate is separated, along with the lower cover assembly.

Referring to FIGS. 3 and 15, the upper cover assembly 30 and the lower cover assembly 40 may respectively include a cover body and a strength-reinforcing plate 42. The cover body forms an appearance of the upper and lower cover assemblies 40 and may be made of a plastic material that is easy to mold. The cover body may have a size capable of covering the top end or the bottom end of the case body 20.

The strength-reinforcing plate 42 may be a metal plate that is assembled to an inner region of a rim of the cover body. The strength-reinforcing plate 42 reinforces the strength of the cover body made of plastic and is connected to the case body 20 to prevent swelling of the case body 20.

The strength-reinforcing plate 42 has a pair of vertical plates 44 which stands vertically with respect to the cover body at intervals corresponding to a width (in a Y-axis direction) of the case body 20. In the case body 20, vertical plate insert portions 140, 240 are formed at the inner surfaces of the plates, which are opposite to each other in a width direction (a Y-axis direction) of the case body 20, so that the pair of vertical plates 44 may be fit in a vertical direction.

In detail, referring to FIGS. 8, 12 to 13 and 15 together, the vertical plate insert portions 140, 240 may be provided in a pair so that the pair of vertical plate insert portions 140, 240 are formed at an inner side of the case body 20, namely at inner sides of the front left plate 110 and the rear left plate 210, which are opposite to each other, along the vertical direction. Each vertical plate insert portion 140, 240 may protrude from the inner surface of the corresponding plate into a "T" shape. In this case, an empty space is slightly formed between the inner surface of the plate and a bent head portion of the vertical plate insert portion 140, 240. The vertical plate 44 may have a thickness capable of entering the empty space.

Four vertical plate insert portions 140, 240 are provided in total, and two vertical plate insert portions 140, 240 are provided as a pair at the inner surface of the front left plate and the inner surface of the rear left plate, respectively. The pair of vertical plate insert portions 140, 240 are spaced apart from each other with an interval corresponding to the width of the vertical plate 44 of the strength-reinforcing plate 42.

Thus, as shown in FIG. 15, when the lower cover assembly 40 is assembled to the bottom end of the case body 20, the vertical plate 44 may be pushed up below two vertical plate insert portions 140, 240, and the vertical plate 44 may be constrained between the inner surface of the plate and the bent head portions of two vertical plate insert portions 140, 240.

Meanwhile, in this embodiment, the upper cover assembly 30 may also include a strength-reinforcing plate, which is identical to the strength-reinforcing plate 42 of the lower cover assembly 40, so that the strength-reinforcing plate 42 of the upper cover assembly 30 and the case body 20 are assembled. This will not be explained in detail here and may be referred to the explanation about the strength-reinforcing plate 42 of the lower cover assembly 40.

Since the pair of vertical plates 44 of the strength-reinforcing plate 42 are coupled to the front plate 100 and the rear plate 200 of the case body 20, which are opposite to each other, by fitting to support the case body 20, the deformation of the case body 20 in a width direction (a Y-axis direction) may be prevented. In other words, in the ESS pack case 10 of the present disclosure, since the upper and lower cover assemblies 40 have a double structure composed of the cover body and the strength-reinforcing portion, the upper and lower cover assemblies 40 firmly hold the upper and lower portions of the case body 20. Also, since the pair of vertical plate 44 additionally supports the inner side of the case body 20, it is possible to prevent swelling of the case body 20 even when the inner pressure of the case body 20 rises.

Figure 16:
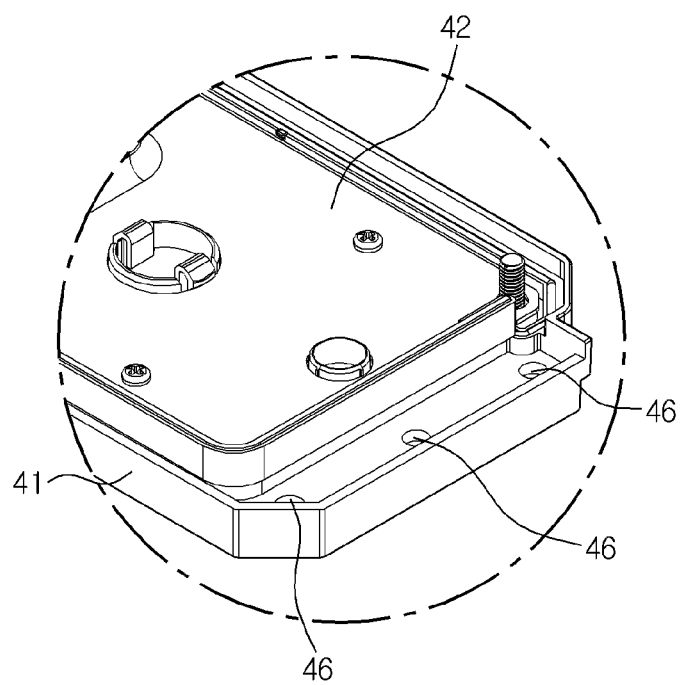
FIG. 16 is an enlarged view showing a region D of FIG. 4.

Also, as shown in FIG. 16, the lower cover assembly 40 according to the present disclosure may further include a drainage hole 46 formed therethrough in a vertical direction. By preparing the drainage hole 46 in the lower cover assembly 40, it is possible to smooth discharge dew condensation and moisture inside the pack case 10.

The ESS pack case 10 according to an embodiment of the present disclosure is formed such that at least two plates are assembled along the circumferential direction as described above, and thus the lateral width of the product is much larger than that of a pack case 10 which is formed by extrusion molding. Thus, the ESS pack case 10 of the present disclosure may give an inner space enough to include various electric components.

In addition, in the case of an integrated pack case 10, it is not easy to discharge the internal pressure since the pack case 10 is completely sealed. However, the ESS pack case 10 of the present disclosure may very easily discharge the inner pressure, compared to the integrated pack case 10, since plates are classified into several parts and assembled separately. Thus, in a state where the internal pressure of the pack case 10 increases, like a flame spread resistance test (a test to check whether flame is exposed out of the pack case after ignition occurs in the pack case), the ESS pack case 10 of the present disclosure may easily discharge the internal pressure and also prevent the deformation of the case body 20 in the width direction by means of the pair of vertical plates 44 of the upper and lower cover assemblies 40, thereby preventing the swelling of the pack case 10.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, when the terms indicating up, down, left and right directions are used in the specification, it is obvious to those skilled in the art that these merely represent relative locations for convenience in explanation and may vary based on a location of an observer or a shape in which an object is placed.

| Reference Signs | |
| --- | --- |
| 10: ESS battery pack case | 20: case body |
| 30: upper cover assembly | 40: lower cover assembly |
| 42: strength-reinforcing plate | 44: vertical plate |
| 46: drainage hole | 50: display panel |
| 60: wall-hanging bracket | 70: heatproof plate |
| 100: front plate | 110: front left plate |
| 120: front right plate | 121: front right upper plate |
| 122: front right lower plate | 200: rear plate |
| 210: rear left plate | 220: rear right plate |
| 130, 230: bolt-coupling block | 140, 240: vertical plate insert portion |
| H1, H2, H3, H4: insert groove | P1, P2, P3, P4: insert protrusion |

What is claimed is:

1. An energy storage system (ESS) battery pack case, which has an inner space formed to accommodate a battery module and electric component, the ESS battery pack case comprising:
    a case body having at least two plates assembled to each other by fitting so as to be connected to each other along a circumferential direction thereof to form a hollow therein, the case body having an open top end and an open bottom end; and
    an upper cover assembly configured to cover the top end of the case body and a lower cover assembly configured to cover the bottom end of the case body,
    wherein the case body includes a front plate which forms a front surface and both side surfaces of the case body, and a rear plate which is coupled to the front plate by the fitting and forms a rear surface of the case body.

2. The ESS battery pack case according to claim 1, wherein an adhesive sealing material is further interposed at every assembling portion of the at least two plates.

3. The ESS battery pack case according to claim 1, wherein an insert groove is prepared at any one of an end of any one plate among the plates and an end of another plate adjacent to the any one plate, and an insert protrusion coupled to the insert groove by the fitting is prepared at the another plate.

4. The ESS battery pack case according to claim 1, wherein the at least two plates are prepared into a predetermined form by means of extrusion molding.

5. The ESS battery pack case according to claim 1, wherein a drainage hole is formed in the lower case assembly to pass therethrough in a vertical direction.

6. The ESS battery pack case according to claim 1, wherein bolt-coupling blocks are provided in the case body to protrude inwards at predetermined locations, and
    wherein the upper and lower cover assemblies have bolt-coupling holes formed to correspond the bolt-coupling blocks in one-to-one relationship so that bolts are respectively coupled and fixed to the top end and the bottom end of the case body.

7. The ESS battery pack case according to claim 1, wherein the upper cover assembly and the lower cover assembly respectively include a cover body configured to cover the top end or the bottom end of the case body and a strength-reinforcing plate made of metal and assembled to an inner region of a rim of the cover body.

8. The ESS battery pack case according to claim 1, wherein the front plate includes a front left plate which forms a part of the front surface and the left surface of the case body, and a front right plate which is coupled to the front left plate by fitting and forms the remaining part of the front surface and the right surface of the case body.

9. The ESS battery pack case according to claim 8, wherein the front right plate includes a front right upper plate and a front right lower plate which are assembled up and down so that a display panel for displaying a state of charge of the battery module to the outside is interposed therebetween.

10. The ESS battery pack case according to claim 9, wherein bolts are further coupled to assembling portions where the front left plate and the front right upper plate are respectively connected to the rear plate, and a latch is coupled to an assembling portion where the front right lower plate is connected to the rear plate.

11. The ESS battery pack case according to claim 9, wherein the rear plate includes a rear left plate which forms a part of the rear surface of the case body, and a rear right plate which is coupled to the rear left plate by fitting and forms the remaining part of the rear surface of the case body.

12. An energy storage system (ESS) battery pack case, which has an inner space formed to accommodate a battery module and electric component, the ESS battery pack case comprising:
    a case body having at least two plates assembled to each other by fitting so as to be connected to each other along a circumferential direction thereof to form a hollow therein, the case body having an open top end and an open bottom end; and
    an upper cover assembly configured to cover the top end of the case body and a lower cover assembly configured to cover the bottom end of the case body,
    wherein an insert groove is prepared at any one of an end of any one plate among the plates and an end of another plate adjacent to the any one plate, and an insert protrusion coupled to the insert groove by the fitting is prepared at the another plate.

13. An energy storage system (ESS) battery pack case, which has an inner space formed to accommodate a battery module and electric component, the ESS battery pack case comprising:

a case body having at least two plates assembled to each other by fitting so as to be connected to each other along a circumferential direction thereof to form a hollow therein, the case body having an open top end and an open bottom end; and an upper cover assembly configured to cover the top end of the case body and a lower cover assembly configured to cover the bottom end of the case body, wherein the upper cover assembly and the lower cover assembly respectively include a cover body configured to cover the top end or the bottom end of the case body and a strength-reinforcing plate made of metal and assembled to an inner region of a rim of the cover body.

14. The ESS battery pack case according to claim 12, wherein the insert groove and the insert protrusion are respectively formed successively along a vertical edge of the plates.

15. The ESS battery pack case according to claim 13, wherein the strength-reinforcing plate has a pair of vertical plates disposed with an interval corresponding to a width of the case body to be stand vertically with respect to the cover body, and wherein the case body has a vertical plate insert portion therein, formed at an inner side of the plates which are opposite to each other in a width direction of the case body, so that the pair of vertical plates are vertically coupled to the vertical plate insert portion by fitting.

16. The ESS battery pack case according to claim 15, wherein the vertical plate insert portion is provided in a pair so that two vertical plate insert portions are disposed to be spaced from each other, and each vertical plate insert portion is formed to protrude and bend from an inner side of the case body into a "T" shape.

* * * * *